US012148562B2

(12) United States Patent
Ikeda et al.

(10) Patent No.: US 12,148,562 B2
(45) Date of Patent: Nov. 19, 2024

(54) MAGNETIC COMPONENT

(71) Applicant: SHINDENGEN ELECTRIC MANUFACTURING CO., LTD., Tokyo (JP)

(72) Inventors: Kosuke Ikeda, Saitama (JP); Yoshiaki Hiruma, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 823 days.

(21) Appl. No.: 17/252,182

(22) PCT Filed: Jun. 29, 2018

(86) PCT No.: PCT/JP2018/024767

§ 371 (c)(1),
(2) Date: Dec. 14, 2020

(87) PCT Pub. No.: WO2020/003484

PCT Pub. Date: Jan. 20, 2020

(65) Prior Publication Data

US 2021/0265103 A1 Aug. 26, 2021

(51) Int. Cl.
*H01F 27/28* (2006.01)
*H01F 27/32* (2006.01)
*H01F 30/10* (2006.01)

(52) U.S. Cl.
CPC ..... *H01F 27/2876* (2013.01); *H01F 27/2847* (2013.01); *H01F 27/324* (2013.01); *H01F 30/10* (2013.01)

(58) Field of Classification Search
CPC ............. H01F 27/2876; H01F 27/2847; H01F 27/324; H01F 30/10; H01F 27/22;
(Continued)

(56) References Cited

U.S. PATENT DOCUMENTS 3,602,859 A * 8/1971 Dao ...................... H01F 27/245 336/212
6,392,519 B1 * 5/2002 Ronning ............... H01F 27/025 336/61

(Continued)

FOREIGN PATENT DOCUMENTS

CA 2000087 A1 * 4/1993
EP 3327738 A1 5/2018

(Continued)

OTHER PUBLICATIONS

PCT International Preliminary Report on Patentability (Chapter I) with Written Opinion from PCT/JP2018/024767 issued on Dec. 29, 2020 and its English translation from WIPO.

(Continued)

*Primary Examiner* — Tuyen T Nguyen
(74) *Attorney, Agent, or Firm* — Ladas & Parry, LLP

(57) ABSTRACT

A magnetic component has a primary coil 10; a secondary coil 20 disposed to face the primary coil 10; a core 500 which passes through the primary coil 10 and the secondary coil 20; and a coil sealing part 50 which seals at least the primary coil 10 and the secondary coil 20, and a part or whole of region between the primary coil 10 and the secondary coil 20 and the core 500.

6 Claims, 27 Drawing Sheets

(58) Field of Classification Search
CPC ........... H01F 27/327; H01F 2027/2809; H01F 2027/2819; H01F 27/2804
See application file for complete search history.

(56) References Cited

U.S. PATENT DOCUMENTS

| | | | | |
|---|---|---|---|---|
| 7,414,510 | B1 * | 8/2008 | Cheng | H01F 27/324 336/200 |
| 8,441,331 | B2 * | 5/2013 | Maple | H01F 41/00 336/198 |
| 2015/0007120 | A1 | 1/2015 | Erickson | |

FOREIGN PATENT DOCUMENTS

| | | | | | |
|---|---|---|---|---|---|
| JP | S55122326 | U | | 8/1980 | |
| JP | S5844583 | U | | 3/1983 | |
| JP | H05283247 | A | | 10/1993 | |
| JP | 2012038941 | A | | 2/2012 | |
| JP | 2012104724 | A | | 5/2012 | |
| JP | 2012231616 | A | | 11/2012 | |
| JP | 2014056868 | A | | 3/2014 | |
| JP | 2015043354 | A | * | 3/2015 | H01F 27/06 |
| JP | 2015053407 | A | | 3/2015 | |

OTHER PUBLICATIONS

Office Action for Japanese Patent Application 2020-526845 issued on Mar. 29, 2022 with English translation provided by Global Dossier.

Extended European Search Report from EP app. No. 18924161.5, dated Jan. 24, 2022, all pages.

International Search Report in the international application No. PCT/JP2018/024767, mailed on Sep. 25, 2018.

* cited by examiner

MAGNETIC COMPONENT

CROSS-REFERENCE TO RELATED APPLICATION

The present application is the U.S. national phase of PCT Application No. PCT/JP2018/024767 filed on Jun. 29, 2018, the disclosure of which is incorporated herein by reference in its entirety.

TECHNICAL FIELD

The present invention relates to a magnetic component having a primary coil and a secondary coil.

BACKGROUND ART

Conventionally, in a transformer having a primary coil and a secondary coil, it has been common to provide a heat dissipation sheet between wirings forming the respective coils in order to maintain electrical insulation in the respective coils. However, in a case where such heat dissipation sheets are provided, a space is inevitably formed in the heat dissipation sheet, and thus there is a problem that thermal conductivity decreases. JP 2014-56868 A proposes to secure heat dissipation by using a resin having good thermal conductivity; however, it still cannot be said to be sufficient from the viewpoint of heat dissipation.

Furthermore, although it has been conventionally proposed to seal a coil with a resin as in JP 5-283247 A, it is merely proposed to simply seal one coil with a resin.

SUMMARY OF INVENTION

Problem to be Solved by Invention

The present invention provides an aspect in which thermal conductivity and heat dissipation can be further improved in a magnetic component having a primary coil and a secondary coil.

Means for Solving Problem

[Concept 1]

A magnetic component may comprise:

- a primary coil;
- a secondary coil disposed to face the primary coil;
- a core which passes through the primary coil and the secondary coil; and
- a coil sealing part which seals at least the primary coil and the secondary coil, and a part or whole of region between the primary coil and the secondary coil and the core.

[Concept 2]

In the magnetic component according to concept 1, an insulating sheet may be provided between the primary coil or the secondary coil and the core.

[Concept 3]

In the magnetic component according to concept 1 or 2, an insulating sheet may be provided between one surface side of the primary coil or the secondary coil and the core, or between another surface side of the primary coil or the secondary coil and the core.

[Concept 4]

In the magnetic component according to any one of concepts 1 to 3, an insulating sheet may be provided between one lateral side of the primary coil or the secondary coil and the core, or between another lateral side of the primary coil or the secondary coil and the core.

[Concept 5]

In the magnetic component according to any one of concepts 1 to 4, another surface of the core may be exposed from the coil sealing part, or one surface of the core may be exposed from the coil sealing part.

[Concept 6]

In the magnetic component according to any one of concepts 1 to 5,

- the coil sealing part may cover entirety of the core, and
- a thickness of the coil sealing part on another surface side may be thinner than a thickness of the coil sealing part on one surface side, or a thickness of the coil sealing part on one surface side may be thinner than a thickness of the coil sealing part on another surface side.

[Concept 7]

The magnetic component according to any one of concepts 1 to 6 may further comprise:

- a primary-side electronic element connected to the primary coil;
- a primary-side sealing part sealing the primary-side electronic element;
- a secondary-side electronic element connected to the secondary coil; and
- a secondary-side sealing part sealing the secondary-side electronic element, wherein
- materials of the coil sealing part, the primary-side sealing part, and the secondary-side sealing part may be identical.

[Concept 8]

In the magnetic component according to any one of concepts 1 to 7,

- the coil sealing part may have a first sealing part which seals the primary coil and the secondary coil, and a second sealing part which seals at least a part of the core, and
- a material for the first sealing part may have a higher fluidity than a material for the second sealing part.

[Concept 9]

In the magnetic component according to any one of concepts 1 to 8,

- the coil sealing part may have a first sealing part which seals the primary coil and the secondary coil, and a second sealing part which seals at least a part of the core, and
- thermal conductivity of the second sealing part may be higher than thermal conductivity of the first sealing part.

[Concept 10]

The magnetic component according to any one of concepts 1 to 9 may further comprise:

- a primary-side electronic element connected to the primary coil;
- a primary-side sealing part sealing the primary-side electronic element;
- a secondary-side electronic element connected to the secondary coil; and
- a secondary-side sealing part sealing the secondary-side electronic element, wherein the coil sealing part may have a first sealing part which seals the primary coil and the secondary coil, and a second sealing part which seals at least a part of the core, a material of the first sealing part and a material of the second sealing part may be different, and materials of the first sealing part, the primary-side sealing part and the secondary-side sealing part may be identical, or materials of the second sealing part, the primary-side sealing part and the secondary-side sealing part may be identical.

Effect of Invention

As an aspect of the present invention, in a case of adopting an aspect in which the coil sealing part made of sealing resin for sealing the primary coil and the secondary coil is provided, space having a low thermal conductivity that is inevitably formed between the primary coil and the secondary coil can be eliminated, thermal conductivity can be increased, and heat dissipation can be improved. Furthermore, as an aspect of the present invention, in a case of adopting an aspect in which a part or whole of the region between the core and the coils is also sealed with the coil sealing part, space with low thermal conductivity provided between the core and the coil can be eliminated, and thermal conductivity can be increased. Therefore, heat dissipation can be further improved.

DESCRIPTION OF EMBODIMENTS

First Embodiment

<<Configuration>>

Figure 3:
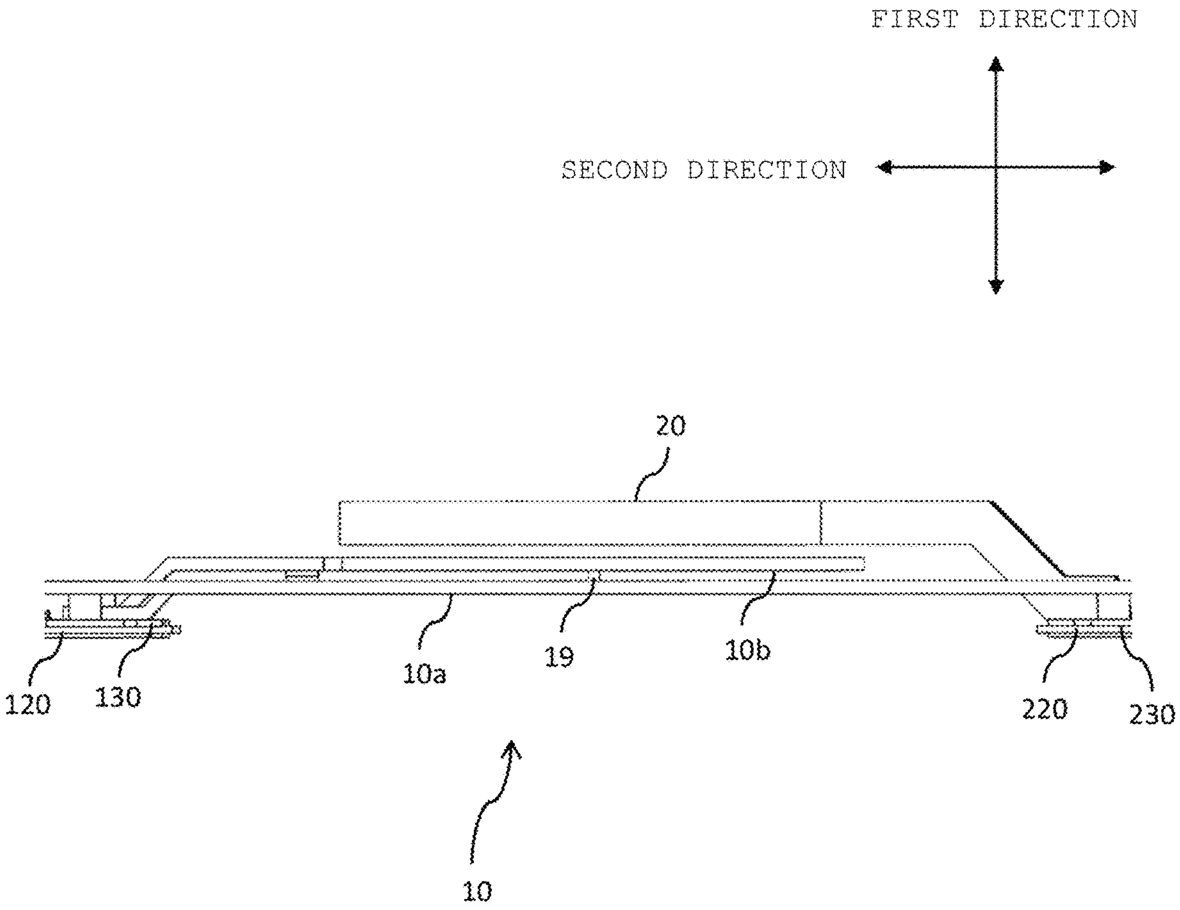
FIG. 3 is a side view of a primary coil and a secondary coil which can be used in the first embodiment of the present invention as viewed along a third direction.

In the present embodiment, "one side" means the upper side in FIG. 3, and "another side" means the lower side in FIG. 3. The up-down direction in FIG. 3 is referred to as a "first direction", the right-left direction in FIG. 3 is referred to as a "second direction", and the front-back direction of the sheet in FIG. 3 is referred to as a "third direction". The in-plane direction including the second direction and the third direction is called a "planar direction".

Figure 1:
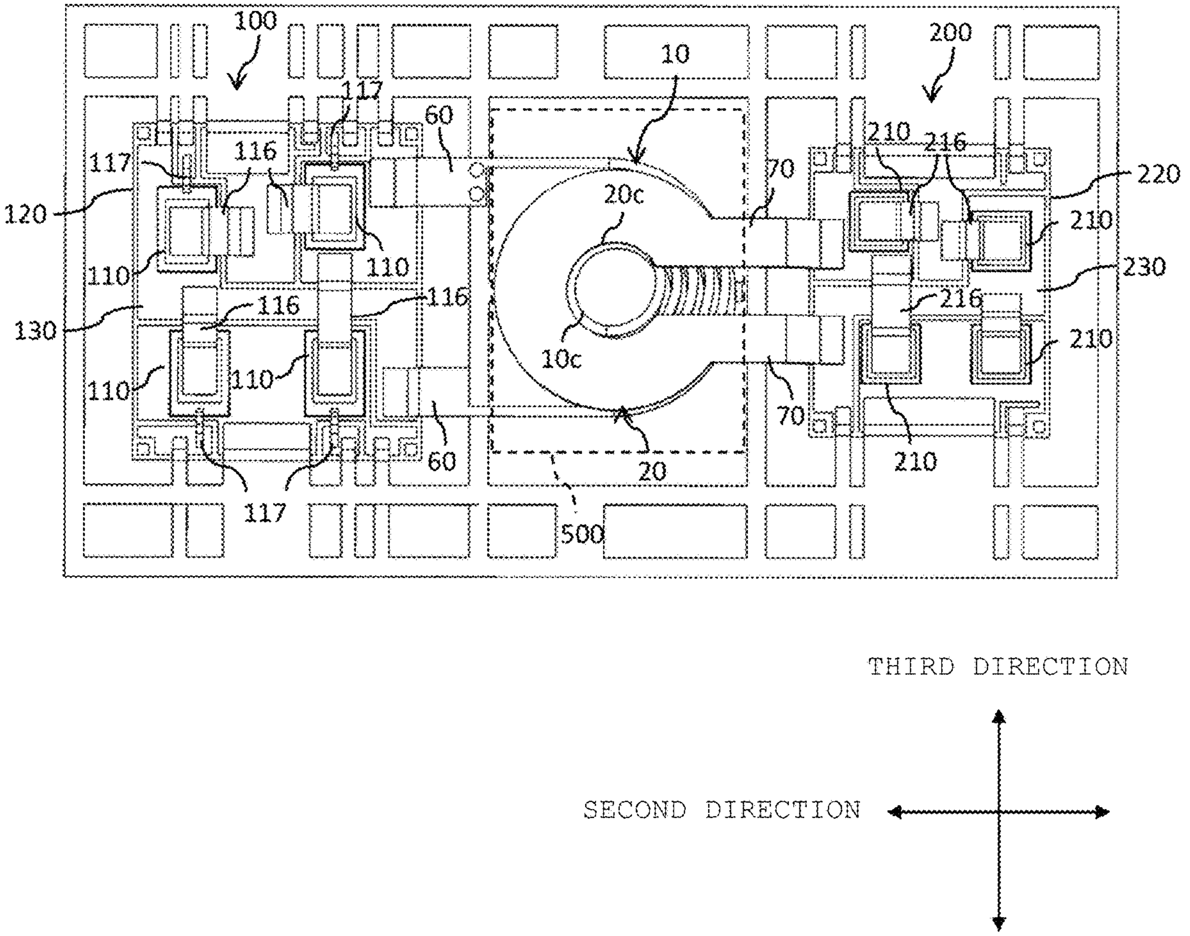
FIG. 1 is a plan view illustrating an electronic device that can be used in a first embodiment of the present invention before being separated from a lead frame.

As illustrated in FIG. 1, a magnetic component such as a transformer according to the present embodiment may have a primary coil 10, a secondary coil 20 disposed to face the primary coil 10, a core 500 (see FIG. 4) which passes through the primary coil 10 and the secondary coil 20, and a coil sealing part 50 (see FIG. 4) which seals at least the primary coil 10, the secondary coil 20, and a part or the whole of the region (boundary portion) between the core 500 and the primary coil 10 and the secondary coil 20. The core 500 may be an E core having a leg part 510 at the center, and the leg part 510 of the core 500 may pass through center holes 10*c*, 20*c* which are substantially circular and are provided at the centers of the primary coil 10 and the secondary coil 20, respectively. A part or the whole of the region between the leg part 510 and the coils 10, 20 may be sealed by the coil sealing part 50. An electronic device according to the present embodiment may have the magnetic component described above, and a primary-side electronic element 110 and a secondary-side electronic element 210 to be described later.

The coil sealing part 50 may cover entirety of the outside of the peripheral edge of the core 500, and the core 500 may not be exposed from the coil sealing part 50.

Figure 2:
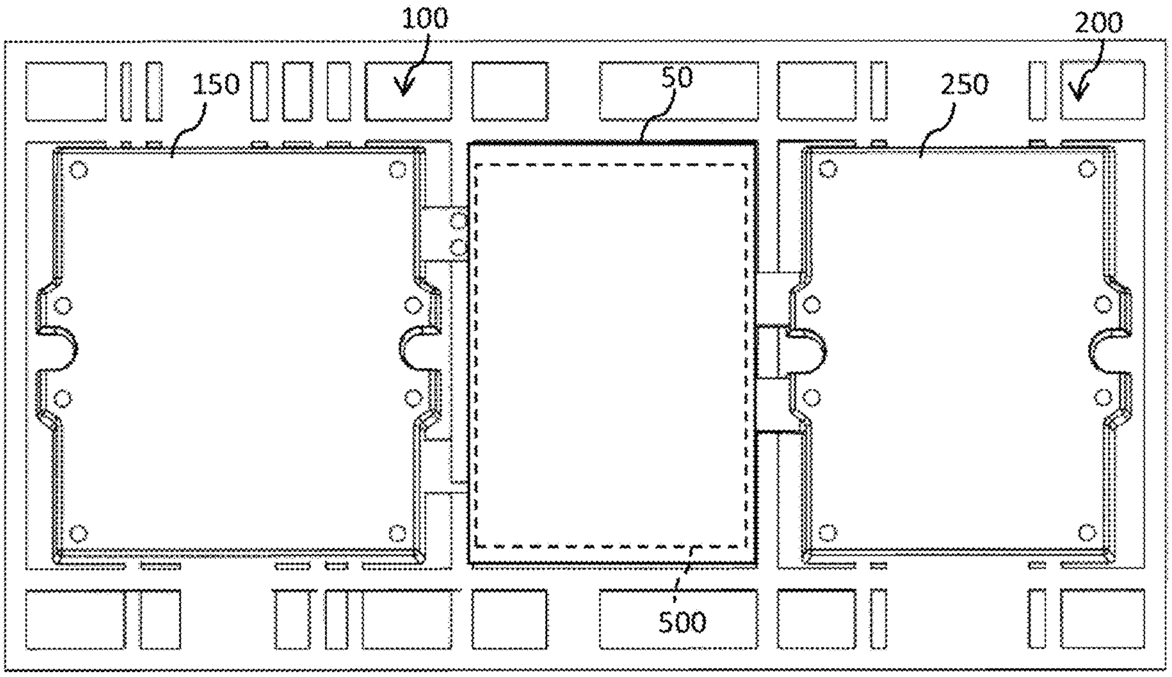
FIG. 2 is a plan view corresponding to FIG. 1 illustrating a coil sealing part, a primary-side sealing part, and a secondary-side sealing part which can be used in the first embodiment of the present invention.

As illustrated in FIGS. 1 and 2, the primary-side electronic element 110 connected to the primary coil 10 may be sealed by the primary-side sealing part 150. The secondary-side electronic element 210 connected to the secondary coil 20 may be sealed by the secondary-side sealing part 250. The materials of the coil sealing part 50, the primary-side sealing part 150, and the secondary-side sealing part 250 may be identical. However, the materials for the coil sealing part 50, the primary-side sealing part 150, and the secondary-side sealing part 250 are not limited to this, and may be different materials. The primary-side sealing part 150 and the secondary-side sealing part 250 may be made of an identical material, and the coil sealing part 50, the primary-side sealing part 150, and the secondary-side sealing part 250 may be made of different materials.

A first electronic module 100 having the primary-side electronic element 110 and the primary-side sealing part 150 may be provided. As illustrated in FIG. 1, the first electronic module 100 may have a primary-side substrate 120, a plurality of primary-side conductor layers 130 provided on one surface of the primary-side substrate 120, and a primary-side electronic element 110 provided on one surface of the primary-side conductor layer 130. The surfaces on one side of the primary-side electronic element 110, the primary-side substrate 120, and the surface on one side of the primary-side conductor layer 130 may be sealed by the primary-side sealing part 150 (see FIG. 2).

As illustrated in FIG. 1, a second electronic module 200 having the secondary-side electronic element 210 and the secondary-side sealing part 250 may be provided. As illustrated in FIG. 1, the second electronic module 200 may have a secondary-side substrate 220, a plurality of secondary-side conductor layers 230 provided on one surface of the secondary-side substrate 220, and a secondary-side electronic element 210 provided on one surface of the secondary-side conductor layer 230. The surfaces on one side of the secondary-side electronic element 210, the secondary-side substrate 220, and the surface on one side of the secondary-side conductor layer 230 may be sealed by the secondary-side sealing part 250 (see FIG. 2).

Unlike the aspect illustrated in FIG. 1, the primary-side electronic element 110 may be provided on a primary-side extended part 60 extending from the primary coil 10 to the outside of the coil sealing part 50. The secondary-side electronic element 210 may be provided on a secondary-side extended part 70 extending from the secondary coil 20 to the outside of the coil sealing part 50.

A plurality of the primary-side electronic elements 110 may be provided. One of the primary-side electronic elements 110 or two or more of the primary-side electronic elements 110 are provided on the primary-side extended part 60 via a conductive adhesive such as solder, and the rest of the primary-side electronic elements 110 may be provided on the primary-side substrate 120.

A plurality of the secondary-side electronic elements 210 may be provided. One of the secondary-side electronic elements 210 or two or more of the secondary-side electronic elements 210 are provided on the secondary-side extended part 70, and the rest of the secondary-side electronic elements 210 may be provided on the secondary-side substrate 220.

Figure 6:
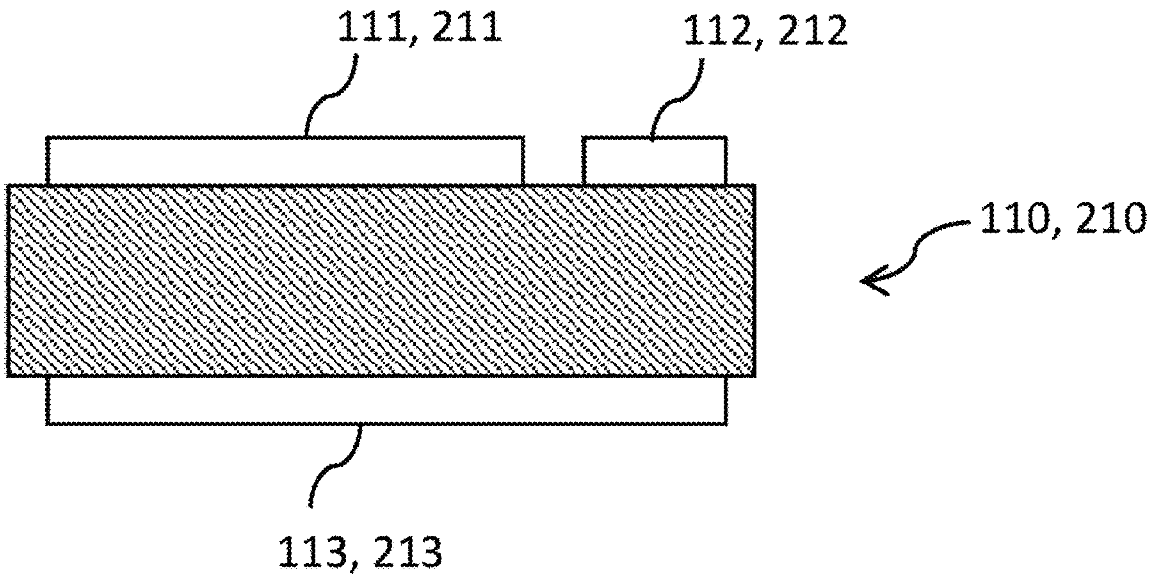
FIG. 6 is a side sectional view illustrating a primary-side electronic element and a secondary-side electronic element which can be used in the first embodiment of the present invention.

As illustrated in FIG. 6, on one surface of the primary-side electronic element 110, a primary-side first electrode (for example, a source electrode) 111 and a primary-side second electrode (for example, a gate electrode) 112 may be provided, and on another surface of the primary-side electronic element 110, a primary-side third electrode (for example, a drain electrode) 113 may be provided. The primary-side first electrode 111 and the primary-side conductor layer 130 may be connected via a primary-side first connector 116 (see FIG. 1) and a conductive adhesive such as solder. The primary-side second electrode 112 and the primary-side conductor layer 130 may be connected via a primary-side second connector 117 (see FIG. 1) and a conductive adhesive such as solder. The primary-side third electrode 113 and the primary-side conductor layer 130 may be connected via a conductive adhesive such as solder. Furthermore, as illustrated in FIG. 7, the primary-side first electrode 111 may be provided on the one surface of the primary-side electronic element 110, and the primary-side second electrode 112 may be provided on the other surface of the primary-side electronic element 110.

Figure 7:
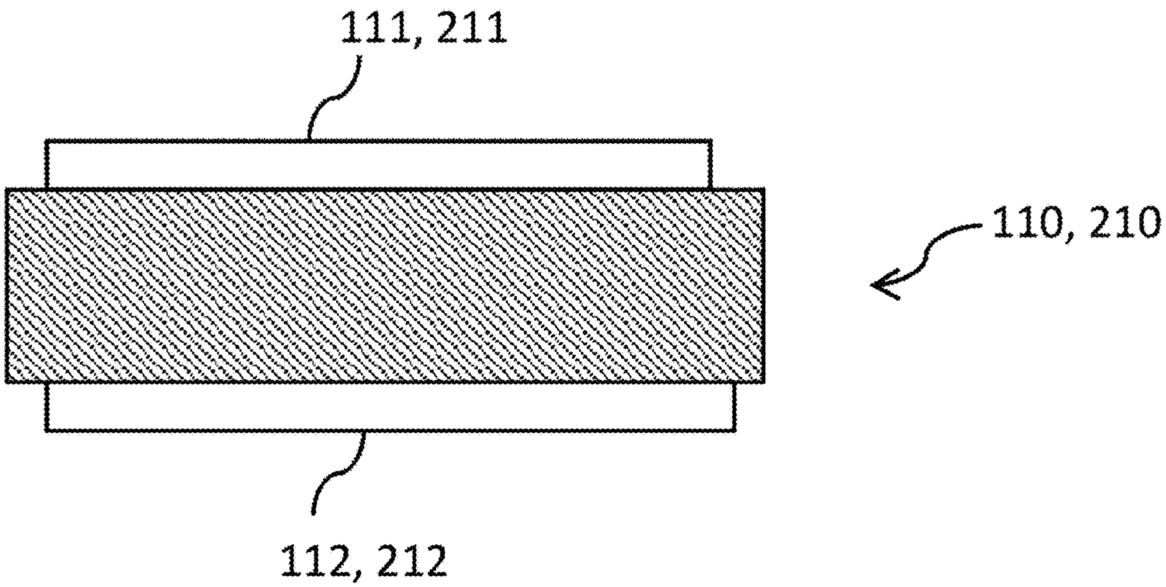
FIG. 7 is a side sectional view illustrating another aspect of the primary-side electronic element and the secondary-side electronic element which can be used in the first embodiment of the present invention.

As illustrated in FIG. 7, a secondary-side first electrode 211 may be provided on one surface of the secondary-side electronic element 210, and a secondary-side second electrode 212 may be provided on another surface of the secondary-side electronic element 210. The secondary-side first electrode 211 and the secondary-side conductor layer 230 may be connected via the secondary-side first connector 216 (see FIG. 1) via a conductive adhesive such as solder. Furthermore, as illustrated in FIG. 6, on the one surface of the secondary-side electronic element 210, the secondary-side first electrode (for example, a source electrode) 211 and the secondary-side second electrode (for example, a gate electrode) 212 may be provided, and on the other surface of the secondary-side electronic element 210, a secondary-side third electrode (for example, a drain electrode) 213 may be provided. The secondary-side third electrode 213 and the secondary-side conductor layer 230 may be connected via a conductive adhesive such as solder.

As illustrated in FIG. 3, the primary coil 10 may have a first coil 10*a* and a second coil 10*b* connected to the first coil 10*a*. The second coil 10*b* may be provided on one side of the first coil 10*a*, and the first coil 10*a* and the second coil 10*b* may be connected by a connecting part 19 which is linear and extends along the first direction. The connecting part 19 does not need to be completely parallel to the first direction, and may be inclined in the first direction. The aspect of "extending along the first direction" also includes the aspect of extending so as to be inclined in the first direction in this manner. The secondary coil 20 may be provided on one side of the second coil 10*b*.

The first coil 10*a* and the second coil 10*b* of the primary coil 10 may have the identical number of turns or different numbers of turns. As an example, each of the first coil 10*a* and the second coil 10*b* of the primary coil 10 may have five turns. The number of turns of the secondary coil 20 may be one, or may be two or more. An aspect in which the number of turns of the secondary coil 20 is less than 1 and the secondary coil 20 may not make a circle may be adopted.

<<Effect>>

Next, operation and effect according to the present embodiment having the above-described configuration will be described. Note that any aspect described in "Effect" can be adopted in the above configuration.

Figure 4:
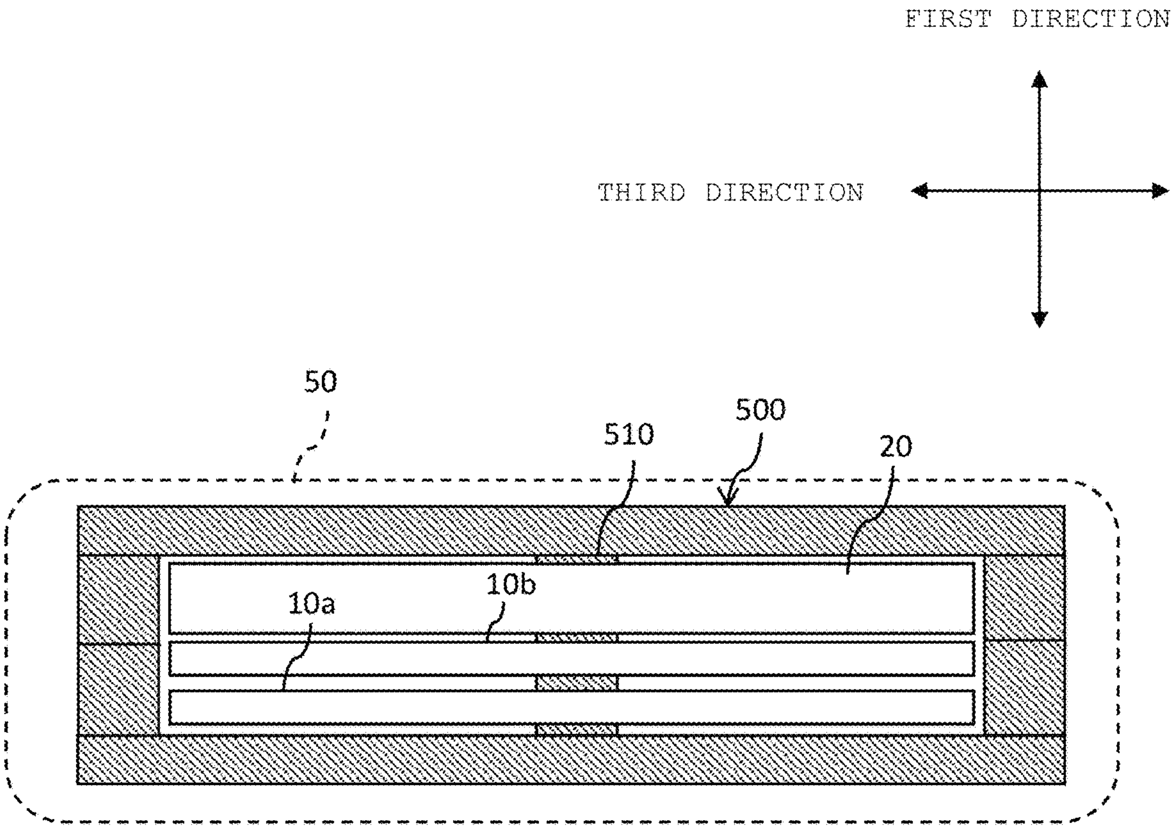
FIG. 4 is a side view of the primary coil, the secondary coil, the core, and the coil sealing part which can be used in the first embodiment of the present invention as viewed along a second direction.

In the present embodiment, as illustrated in FIG. 4, in a case of adopting an aspect in which the coil sealing part 50 made of sealing resin for sealing the primary coil 10 and the secondary coil 20 is provided, space having a low thermal conductivity that is inevitably formed between the primary coil 10 and the secondary coil 20 can be eliminated, thermal conductivity can be increased, and heat dissipation can be improved. Furthermore, in the case of adopting an aspect in which a part or the whole of the region between the core 500 and the coils 10, 20 is also sealed with the coil sealing part 50, space with low thermal conductivity provided between the core 500 and the coil can be eliminated, and thermal conductivity can be increased. Therefore, heat dissipation can be further improved.

Figure 5:
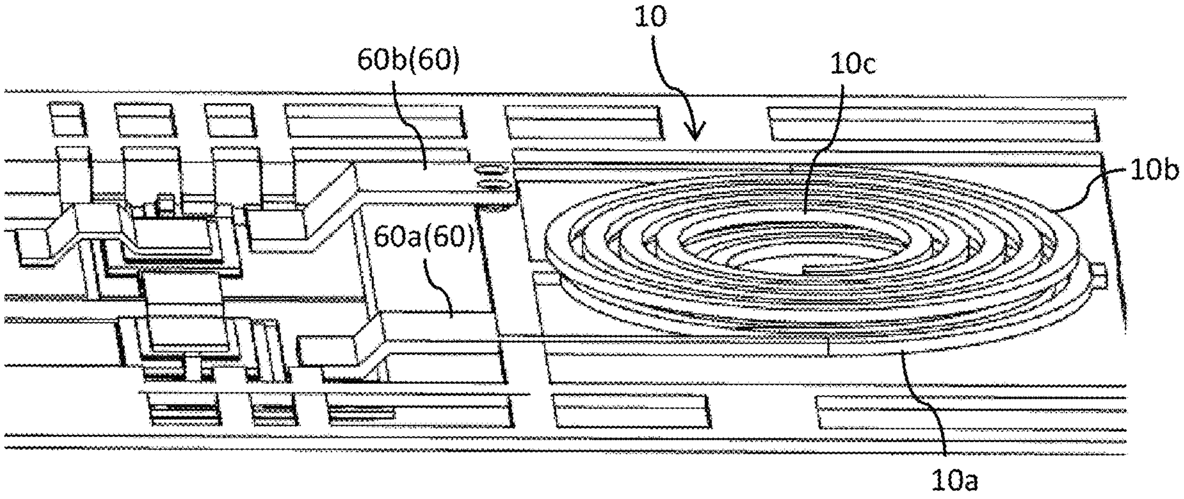
FIG. 5 is a perspective view illustrating the primary coil and a primary-side extended part which can be used in the first embodiment of the present invention.

As illustrated in FIG. 5, in the case of adopting the aspect in which the first coil 10*a* of the primary coil 10 and the primary-side extended part 60 extending to the inside of the primary-side sealing part 150 are integrated, it is advantageous in that a member in which the primary coil 10 and the primary-side extended part 60 are integrated can be easily manufactured by forming the primary coil 10 and the primary-side extended part 60 in a member such as a lead frame and removing an unnecessary portion.

As illustrated in FIG. 1, in the case of adopting an aspect in which the secondary coil 20 and the secondary-side extended part 70 extending to the inside of the secondary-side sealing part 250 are integrated, a member in which the secondary coil 20 and the secondary-side extended part 70 are integrated can be easily manufactured by forming the secondary coil 20 and the secondary-side extended part 70 in a member such as a lead frame and removing an unnecessary portion.

Figure 8:
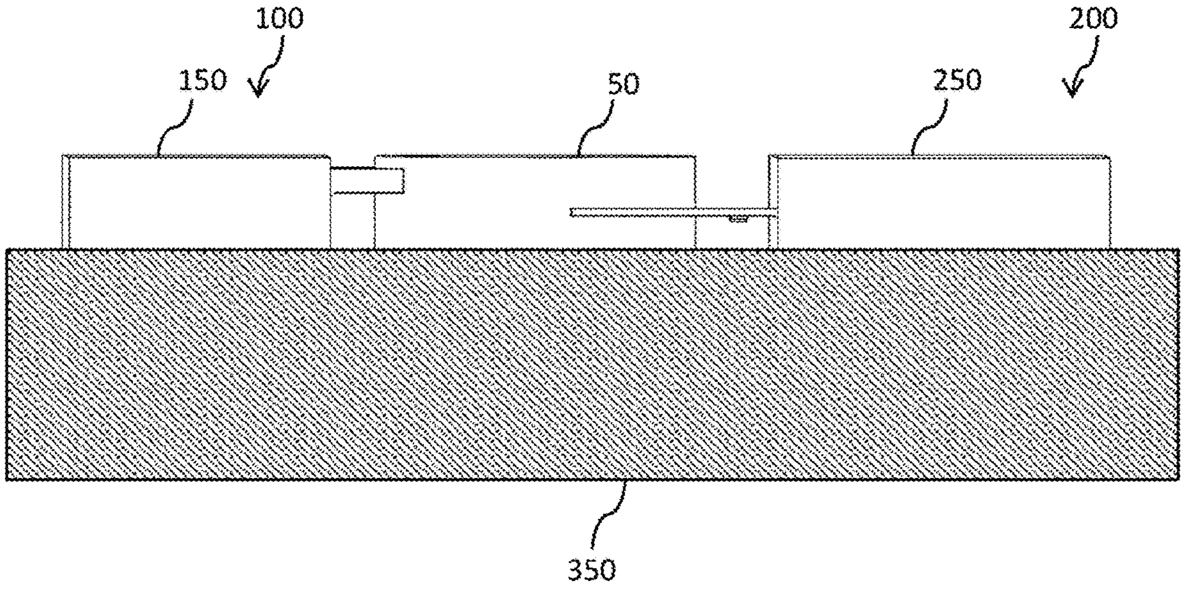
FIG. 8 is a side view illustrating the relationship among the coil sealing part, the primary-side sealing part, the secondary-side sealing part, and a cooling body which can be used in the first embodiment of the present invention.

As illustrated in FIG. 8, a cooling body 350 such as a heat sink may be provided on another surface (back surface) of the coil sealing part 50, another surface (back surface) of the primary-side sealing part 150, and another surface (back surface) of the secondary-side sealing part 250. In the case of adopting such an aspect, it is advantageous in that the coil sealing part 50, the primary-side sealing part 150, and the secondary-side sealing part 250 can be cooled by the cooling body 350.

Second Embodiment

Next, a second embodiment of the present invention will be described.

Figure 9:
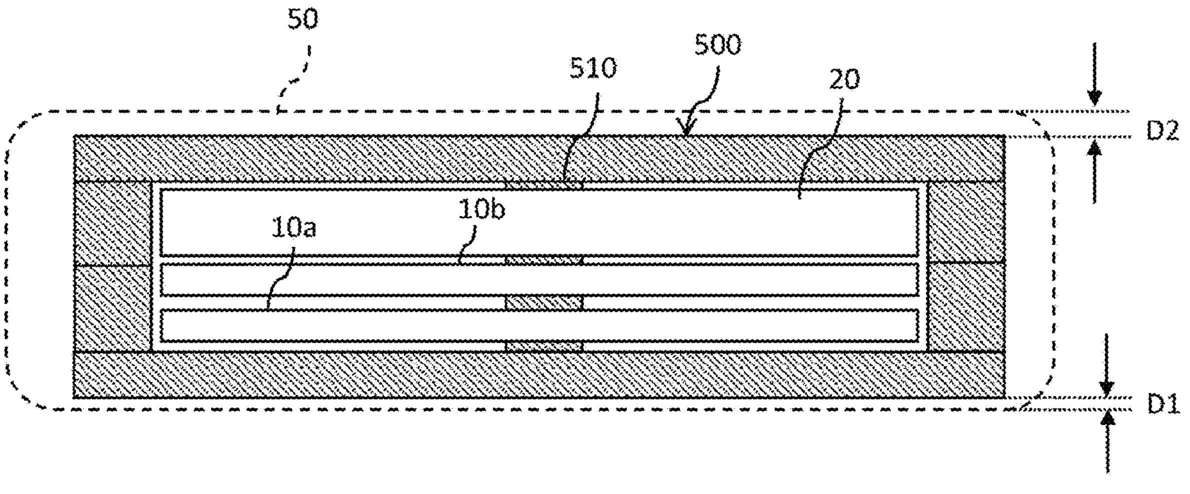
FIG. 9 is a side view of a primary coil, a secondary coil, a core, and a coil sealing part which can be used in a second embodiment of the present invention as viewed along the second direction.

In the present embodiment, as illustrated in FIG. 9, a thickness D1 of a coil sealing part 50 on another surface side may be thinner than a thickness D2 of the coil sealing part 50 on one surface side. Other configurations are similar to those of the first embodiment, and any aspect described in the first embodiment can be adopted. Identical reference signs are used for the members described in the first embodiment.

In the case of adopting an aspect in which the thickness D1 on the other surface side of the coil sealing part 50 is thinner than the thickness D2 on the one surface side of the coil sealing part 50, heat dissipation efficiency on the other surface side of the coil sealing part 50 can be improved. For example, in a case where a cooling body 350 such as a heat sink is provided on the other surface side of the coil sealing part 50, an aspect may be adopted in which the thickness D1 on the other surface side of the coil sealing part 50 is thinner than the thickness D2 on the one surface side of the coil sealing part 50 as in the present embodiment. The thickness D1 on the other surface side of the coil sealing part 50 may be equal to or less than half the thickness D2 on the one surface side of the coil sealing part 50.

According to such an aspect, heat dissipation efficiency on the other surface side of the coil sealing part 50 can be considerably improved. Furthermore, a primary coil 10 having a large number of turns is provided on the other surface side of the coil sealing part 50, and therefore, according to the present aspect, heat generated from the primary coil 10 can be effectively radiated.

Figure 10:
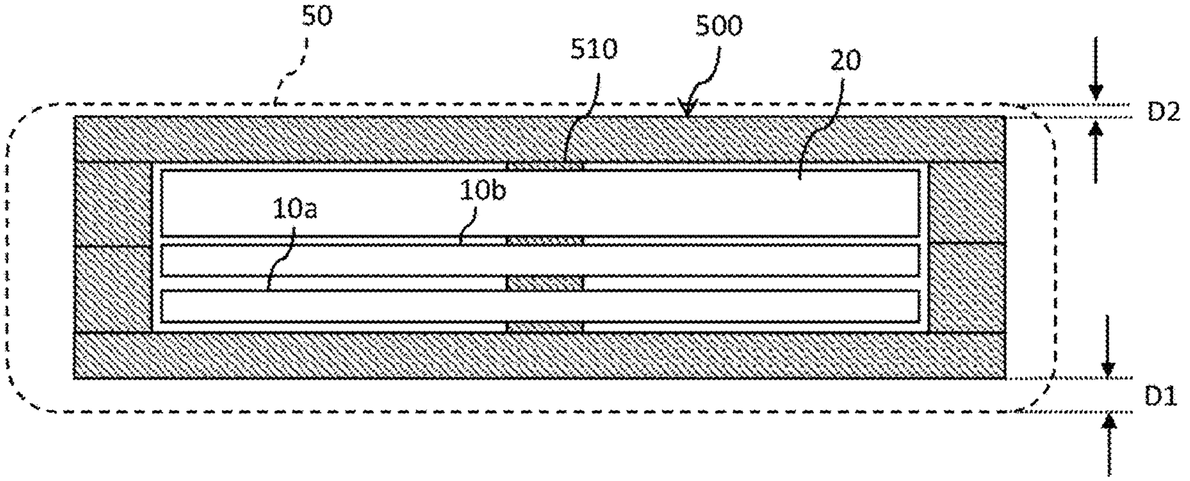
FIG. 10 is a side view of the primary coil, the secondary coil, the core, and the coil sealing part which can be used in a modification of the second embodiment of the present invention as viewed along the second direction.

Unlike the aspect described before, as illustrated in FIG. 10, an aspect in which the thickness D2 on the one surface side of the coil sealing part 50 is thinner than the thickness D1 on the other surface side of the coil sealing part 50 can also be adopted. In this case, heat dissipation efficiency on the one surface side of the coil sealing part 50 can be improved. For example, in a case where the cooling body 350 such as a heat sink is provided on the one surface side of the coil sealing part 50, an aspect may be adopted in which the thickness D2 on the one surface side of the coil sealing part 50 is thinner than the thickness on the other surface side of the coil sealing part 50 as in the present embodiment. The thickness D2 on the one surface side of the coil sealing part 50 may be equal to or less than half the thickness D1 on the other surface side of the coil sealing part 50.

Third Embodiment

Next, a third embodiment of the present invention will be described.

Figure 11:
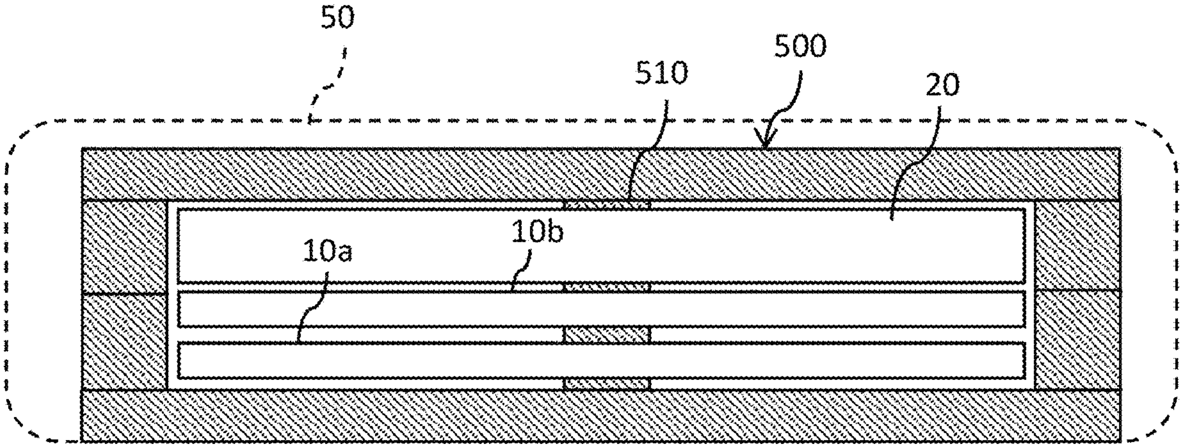
FIG. 11 is a side view of a primary coil, a secondary coil, a core, and a coil sealing part which can be used in a third embodiment of the present invention as viewed along the second direction.

In the present embodiment, as illustrated in FIG. 11, another surface of a core 500 is exposed from a coil sealing part 50. Other configurations are similar to those of the first embodiment or the second embodiment, and any aspect described in the above respective embodiments can be adopted. Identical reference signs are used for the members described in the above respective embodiments.

In the case of adopting an aspect in which the other surface of the core 500 is exposed from the coil sealing part 50 as illustrated in FIG. 11, heat dissipation efficiency on another surface side of the core 500 can be improved. For example, in a case where a cooling body 350 such as a heat sink is provided on the other surface side of the coil sealing part 50, an aspect may be adopted in which the other surface of the core 500 is exposed from the coil sealing part 50 as in the present embodiment. Furthermore, a primary coil 10 having a large number of turns is provided on the other surface side of the coil sealing part 50, and therefore, according to the present aspect, heat generated from the primary coil 10 can be effectively radiated. The surface on one side of the core 500 may not be exposed from the coil sealing part 50. A heat dissipation insulating agent such as a heat dissipation insulating sheet or heat dissipation insulating grease may be provided between the other surface of the core 500 and the cooling body 350.

Figure 12:
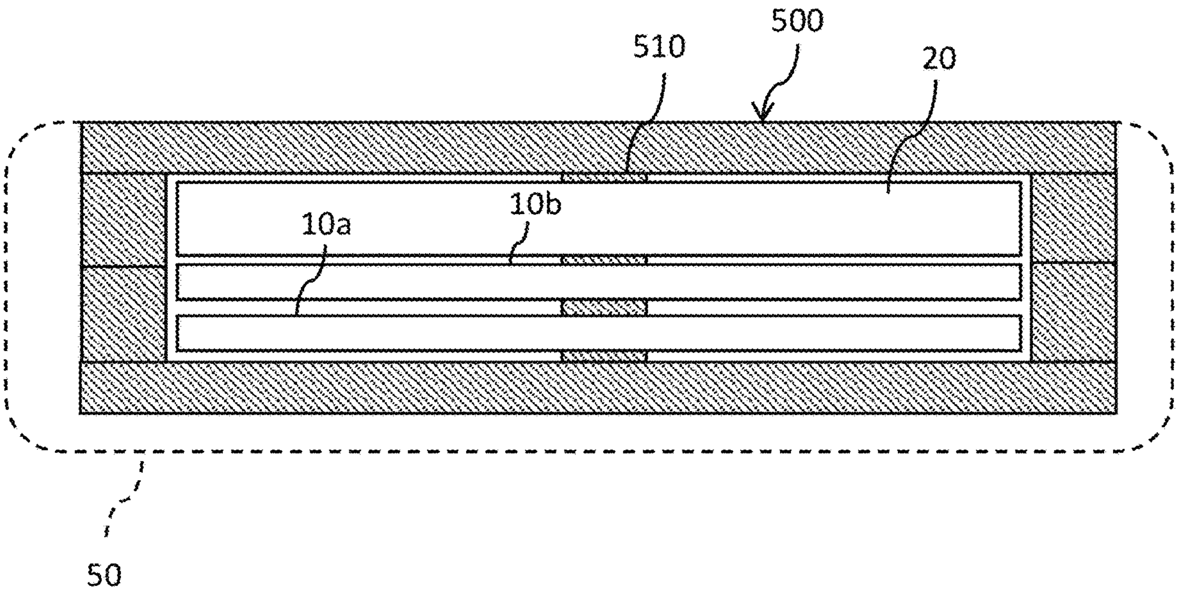
FIG. 12 is a side view of the primary coil, the secondary coil, the core, and the coil sealing part which can be used in Modification 1 of the third embodiment of the present invention as viewed along the second direction.

Unlike the aspect described before, as illustrated in FIG. 12, an aspect can be adopted in which one surface of the core 500 is exposed from the coil sealing part 50. In this case, heat dissipation efficiency on one surface side of the core 500 can be improved. For example, in a case where a cooling body 350 such as a heat sink is provided on the one surface side of the coil sealing part 50, an aspect may be adopted in which the one surface of the core 500 is exposed from the coil sealing part 50 as in the present aspect. The surface on the other side of the core 500 may not be exposed from the coil sealing part 50. A heat dissipation insulating agent such as a heat dissipation insulating sheet or heat dissipation insulating grease may be provided between the one surface of the core 500 and the cooling body 350.

Figure 13:
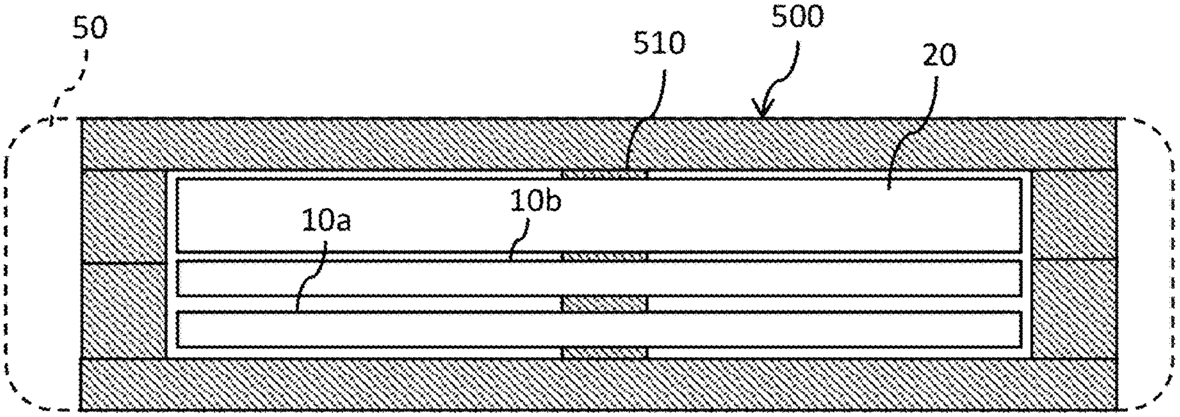
FIG. 13 is a side view of the primary coil, the secondary coil, the core, and the coil sealing part which can be used in Modification 2 of the third embodiment of the present invention as viewed along the second direction.

As illustrated in FIG. 13, an aspect in which the one surface and the other surface of the core 500 are exposed from the coil sealing part 50 can also be adopted. In this case, heat dissipation efficiency on both the one surface side and the other surface side of the core 500 can be improved.

Figure 14:
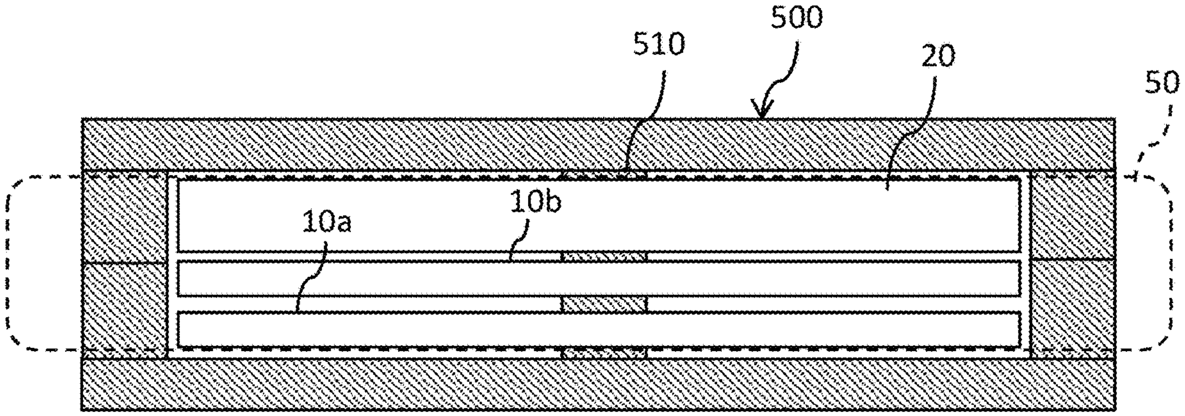
FIG. 14 is a side view of the primary coil, the secondary coil, the core, and the coil sealing part which can be used in Modification 3 of the third embodiment of the present invention as viewed along the second direction.

The coil sealing part 50 may be provided at a location covering a part or the whole of the coils 10, 20 in the first direction, and the one surface and/or the other surface of the core 500 and a part of a side surface of the core 500 may be exposed. In the aspect illustrated in FIG. 14, the coil sealing part 50 is provided at a location covering the whole of the coils 10, 20 in the first direction, and the one surface and the other surface of the core 500 and a part of the side surface of the core 500 may be exposed. According to such an aspect, by making the coil sealing part 50 provided in lieu of a conventional insulating sheet 600 as small as possible to increase the exposed surface, high heat dissipation effect can be expected while maintaining the effect of using the coil sealing part 50. Note that an insulating sheet 600 may be provided between a leg part 510 of the core 500 and center holes 10*c*, 20*c* of the coils 10, 20.

Fourth Embodiment

Next, a fourth embodiment of the present invention will be described.

In the present embodiment, an aspect is adopted in which an insulating sheet 600 is provided between a core 500 and a primary coil 10 or a secondary coil 20. The insulating sheet 600 may be a heat dissipation insulating sheet. Other configurations are similar to those of the above respective embodiments, and any aspect described in the above respective embodiments can be adopted. Identical reference signs are used for the members described in the above respective embodiments.

Figure 15:
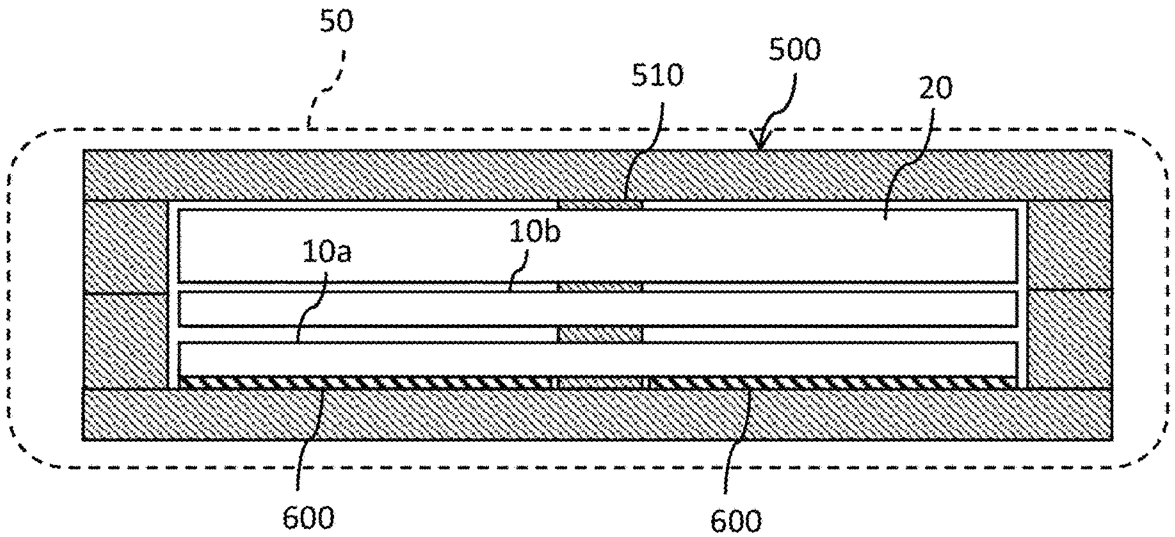
FIG. 15 is a side view of a primary coil, a secondary coil, a core, and a coil sealing part which can be used in a fourth embodiment of the present invention as viewed along the second direction.
Figure 16:
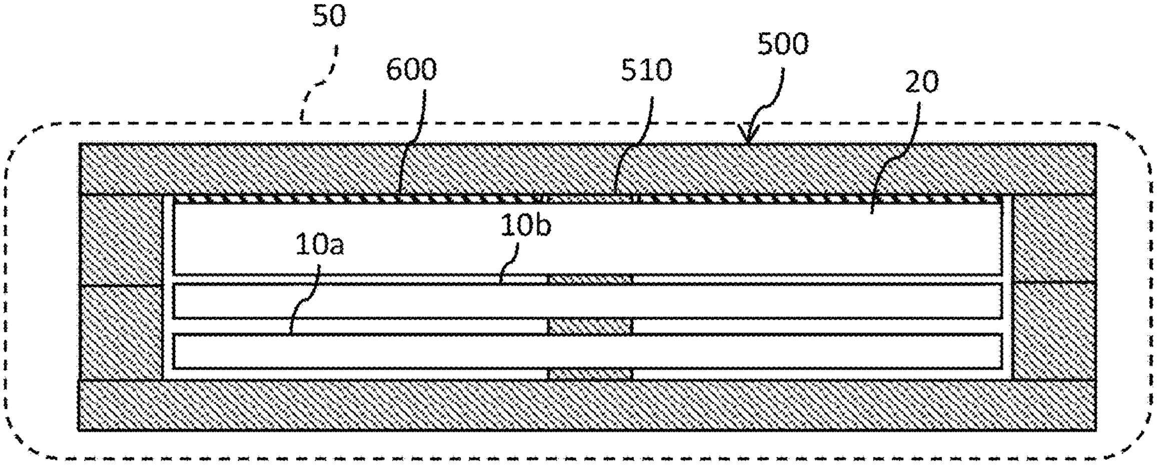
FIG. 16 is a side view of the primary coil, the secondary coil, the core, and the coil sealing part which can be used in Modification 1 of the fourth embodiment of the present invention as viewed along the second direction.

In the present embodiment, the insulating sheet 600 may be provided between the core 500 and one surface side of the coil 10, 20 (secondary coil 20 in FIG. 16). The insulating sheet 600 may be provided between the core 500 and another surface side of the coil 10, 20 (primary coil 10 in FIG. 15). The insulating sheets 600 may be provided between the core 500 and the one surface side of the coil 10, 20 (secondary coil 20 in FIG. 17) and between the core 500 and the other surface side of the coil 10, 20 (primary coil 10 in FIG. 17). By providing the insulating sheet 600 in this manner, one surface or another surface of the coil 10, 20 can be prevented from being electrically connected to the core 500. In a case where a sealing resin is used as a coil sealing part 50 and a certain degree of pressure is applied to inject the sealing resin into a mold, the possibility that pressure from the sealing resin causes the one surface or the other surface of the coil 10, 20 to be electrically connected to the core 500 cannot be denied. In this respect, by adopting the insulating sheet 600 as in the present aspect, the coil and the core 500 can be prevented from being electrically connected.

Figure 17:
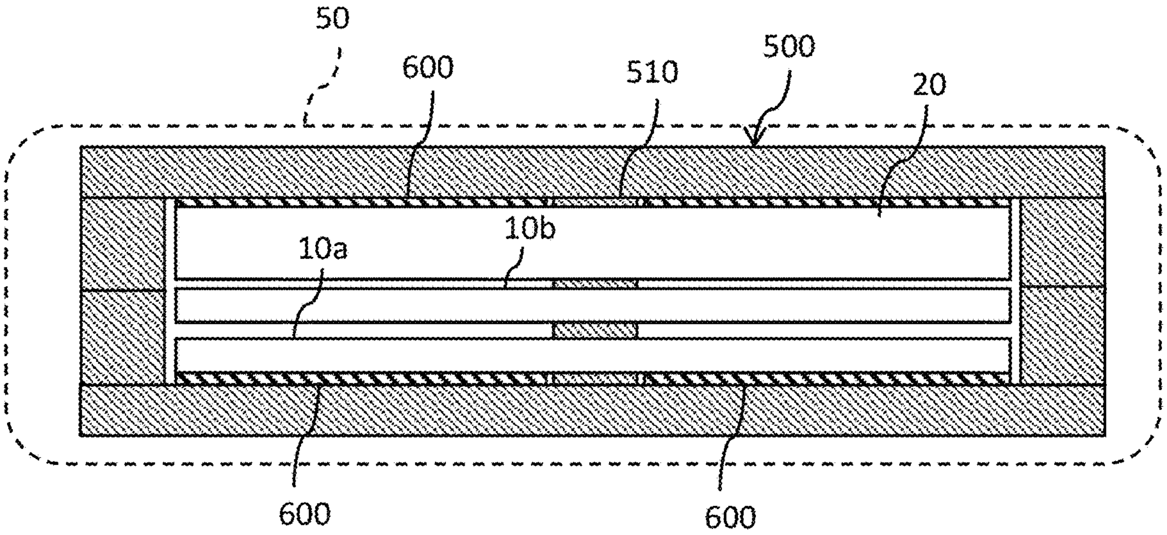
FIG. 17 is a side view of the primary coil, the secondary coil, the core, and the coil sealing part which can be used in Modification 2 of the fourth embodiment of the present invention as viewed along the second direction.

As an example, as illustrated in FIG. 17, the insulating sheet 600 may be provided between the core 500 and the surface on the other side of the first coil 10*a* located outermost on the other side out of the coils 10, 20, and the insulating sheet 600 may be provided between the core 500 and the surface on the one side of the second coil 10*b* located outermost on the one side out of the coils 10, 20. Note that the positional relationship between the primary coil 10 and the secondary coil 20 is not particularly limited, and the primary coil 10 may be located on one side of the secondary coil 20.

Fifth Embodiment

Next, a fifth embodiment of the present invention will be described.

In the present embodiment, an aspect is adopted in which an insulating sheet 600 is provided between a core 500 and one lateral side of coils 10, 20, or between the core 500 and another lateral side of the coils 10, 20. Other configurations are similar to those of the above respective embodiments, and any aspect described in the above respective embodiments can be adopted. Identical reference signs are used for the members described in the above respective embodiments.

Figure 18:
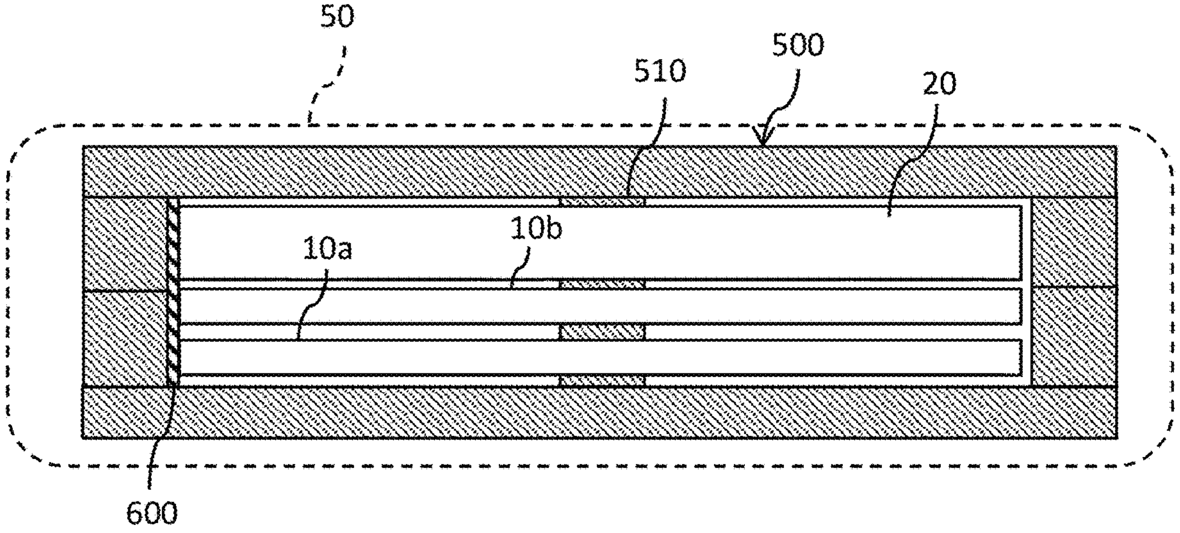
FIG. 18 is a side view of a primary coil, a secondary coil, a core, and a coil sealing part which can be used in a fifth embodiment of the present invention as viewed along the second direction.
Figure 19:
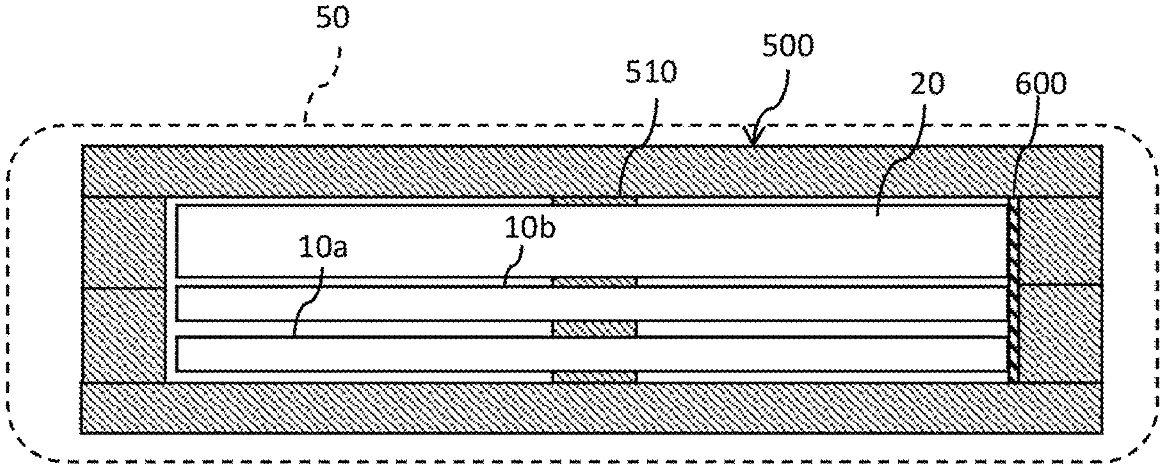
FIG. 19 is a side view of the primary coil, the secondary coil, the core, and the coil sealing part which can be used in Modification 1 of the fifth embodiment of the present invention as viewed along the second direction.
Figure 20:
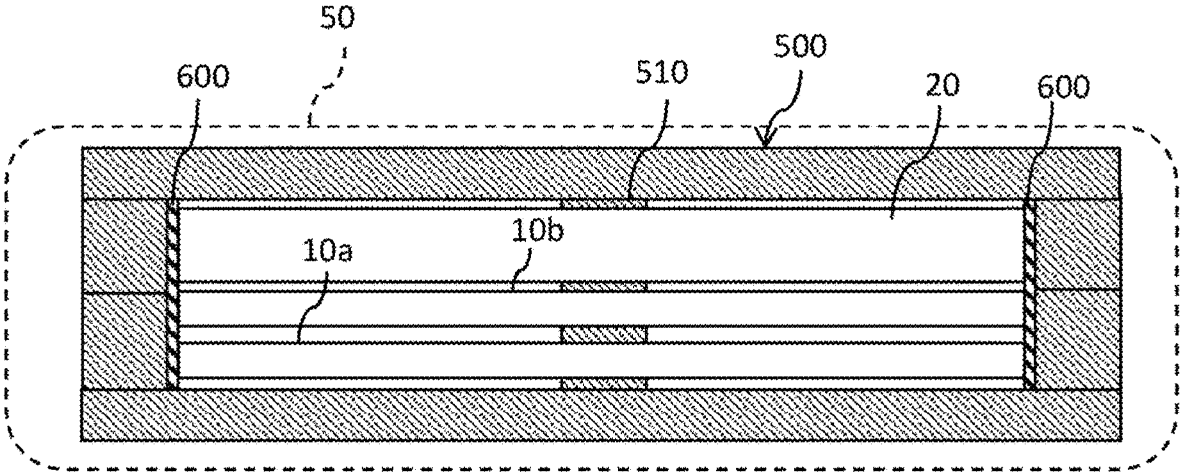
FIG. 20 is a side view of the primary coil, the secondary coil, the core, and the coil sealing part which can be used in Modification 2 of the fifth embodiment of the present invention as viewed along the second direction.

In the present embodiment, the insulating sheet 600 may be provided between an inner peripheral surface of the core 500 and one lateral side of the coils 10, 20 (see FIG. 18, the insulating sheet 600 is provided on the left side in FIG. 18). The insulating sheet 600 may be provided between an inner peripheral surface of the core 500 and another lateral side of the coils 10, 20 (see FIG. 19, the insulating sheet 600 is provided on the right side in FIG. 19). As illustrated in FIG. 20, the insulating sheets 600 may be provided between the core 500 and the one lateral side of the coils 10, 20 and between the core 500 and the other lateral side of the coils 10, 20. By providing the insulating sheets 600 in this manner, the core 500 and lateral surfaces of the coils 10, 20 can be prevented from being electrically connected. In a case where a sealing resin is used as a coil sealing part 50 and certain degree of pressure is applied to inject the sealing resin into a mold, the possibility that pressure from the sealing resin causes the core 500 and the lateral surfaces of the coils 10, 20 to be electrically connected cannot be denied. In this respect, by adopting the insulating sheet 600 as in the present aspect, the coil and the core 500 can be prevented from being electrically connected.

As an example, as illustrated in FIG. 20, the insulating sheet 600 may be provided between the core 500 and one lateral side of each of the first coil 10*a*, the second coil 10*b*, and the secondary coil 20, and the insulating sheet 600 may be provided between the core 500 and the other lateral side of each of the first coil 10*a*, the second coil 10*b*, and the secondary coil 20. In FIG. 20, the continuous insulating sheet 600 prevents the lateral surfaces of the first coil 10*a*, the second coil 10*b*, and the secondary coil 20 from coming into contact with an inner peripheral surface of the core 500. However, the present invention is not limited to such an aspect, and individual insulating sheets 600 corresponding to the respective lateral surfaces of the first coil 10*a*, the second coil 10*b*, and the secondary coil 20 may be provided.

As described above, in the present embodiment, any aspect described in the above respective embodiments can be adopted, and therefore, for example, the aspects described in the fourth embodiment can be adopted. In this case, the insulating sheet 600 is provided between the core 500 and one surface side of the coil 10, 20, and/or between the core 500 and another surface side of the coil 10, 20.

Figure 21:
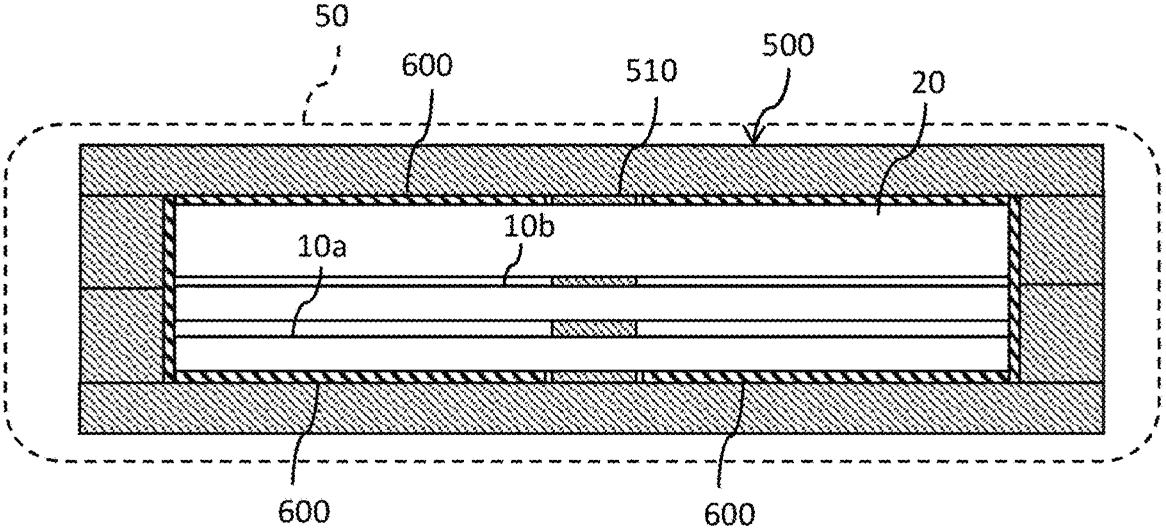
FIG. 21 is a side view of the primary coil, the secondary coil, the core, and the coil sealing part which can be used in Modification 3 of the fifth embodiment of the present invention as viewed along the second direction.

As an example, as illustrated in FIG. 21, while the insulating sheet 600 may be provided between the core 500 and the surface on the other side of the first coil 10*a* located outermost on the other side out of the coils 10, 20 and the insulating sheet 600 may be provided between the core 500 and the surface on the one side of the secondary coil 20 located outermost on the one side out of the coils 10, 20, the insulating sheet 600 may be provided between the core 500 and the one lateral side of each of the first coil 10*a*, the second coil 10*b*, and the secondary coil 20 and the insulating sheet 600 may be provided between the core 500 and the other lateral side of each of the first coil 10*a*, the second coil 10*b*, and the secondary coil 20.

Figure 22:
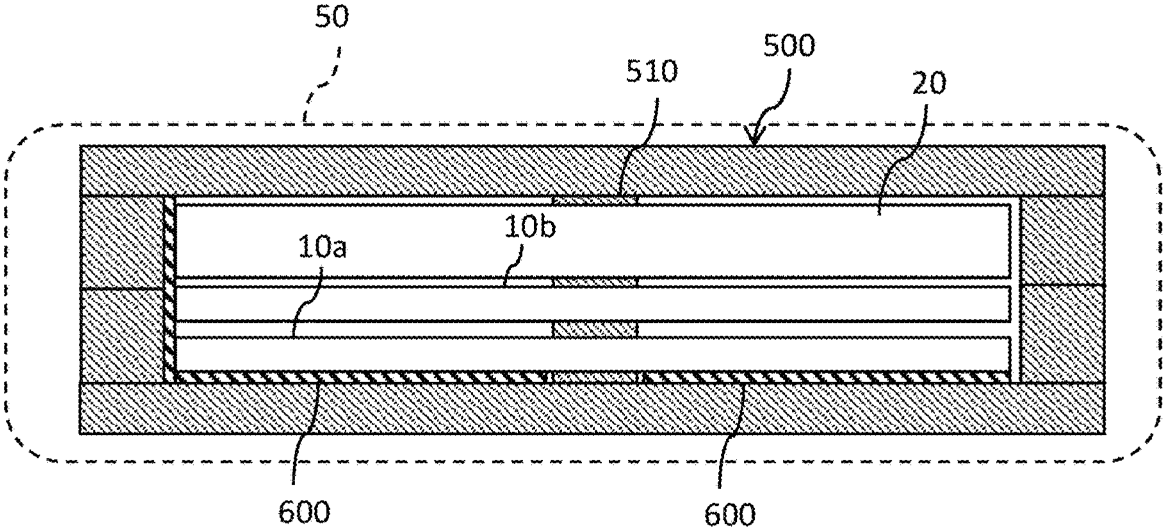
FIG. 22 is a side view of the primary coil, the secondary coil, the core, and the coil sealing part which can be used in Modification 4 of the fifth embodiment of the present invention as viewed along the second direction.
Figure 23:
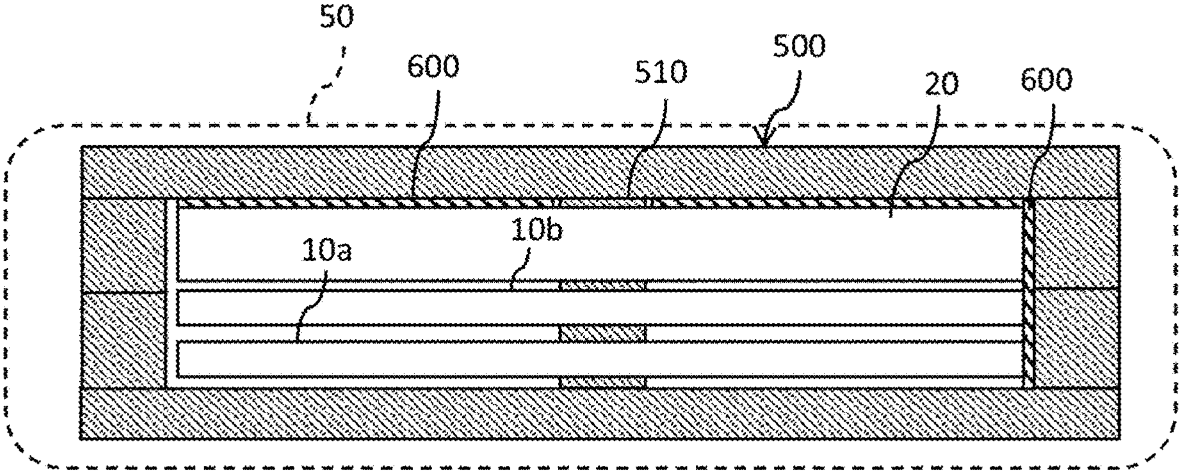
FIG. 23 is a side view of the primary coil, the secondary coil, the core, and the coil sealing part which can be used in Modification 5 of the fifth embodiment of the present invention as viewed along the second direction.

The insulating sheet 600 may be provided only in the direction in which the coil is pressed against the core 500 and positioned. As an example, in the case of adopting an aspect in which while the coils 10, 20 are pressed against the other side of the core 500, the one lateral side of the coils 10, 20 is pressed against the inner peripheral surface of the core 500, as illustrated in FIG. 22, an aspect can also be adopted in which the insulating sheet 600 is provided between the core 500 and the surface on the other side of the first coil 10*a* located outermost on the other side out of the coils 10, 20, and the insulating sheet 600 is provided between the inner peripheral surface of the core 500 and the one lateral side (left side in FIG. 22) of each of the first coil 10*a*, the second coil 10*b*, and the secondary coil 20. Similarly, in the case of adopting an aspect in which while the coils are pressed against the one side of the core 500, the other lateral side of the coils 10, 20 is pressed against the inner peripheral surface of the core 500, as illustrated in FIG. 23, an aspect cam be adopted in which the insulating sheet 600 is provided between the core 500 and the surface on the one side of the secondary coil 20 located outermost on the one side out of the coils 10, 20, and the insulating sheet 600 is provided between the core 500 and the other lateral side (the right side in FIG. 22) of each of the first coil 10*a*, the second coil 10*b*, and the secondary coil 20.

Sixth Embodiment

Next, a sixth embodiment of the present invention will be described.

Figure 24:
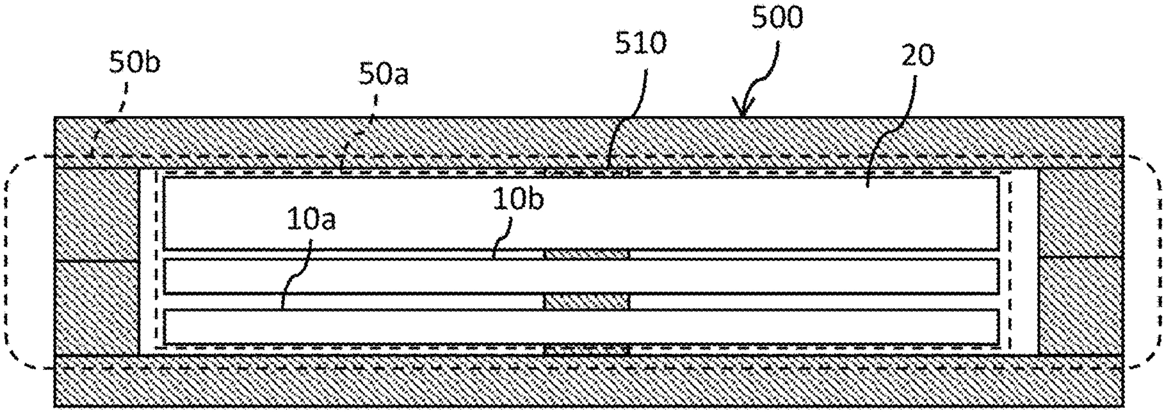
FIG. 24 is a side view of a primary coil, a secondary coil, a core, and a coil sealing part which can be used in a sixth embodiment of the present invention as viewed along the second direction.

In the present embodiment, as illustrated in FIG. 24, a coil sealing part 50 has a first sealing part 50*a* which seals a primary coil 10 and a secondary coil 20, and a second sealing part 50*b* which seals a part or the whole of the first sealing part 50*a* and at least a part of a core 500. An aspect is adopted in which the material for the first sealing part 50*a* has a higher fluidity than that of the material for the second sealing part 50*b*. Note that the second sealing part 50*b* may cover entirety of the peripheral edge of the first sealing part 50*a*, or may cover only a part of the peripheral edge of the first sealing part 50*a*. Other configurations are similar to those of the above respective embodiments, and any aspect described in the above respective embodiments can be adopted. Identical reference signs are used for the members described in the above respective embodiments.

In a case where the interval between the coils 10, 20 such as the primary coil 10 and the secondary coil 20 is narrow, it may be difficult to inject a material such as a sealing resin into the interval. In a case where the sealing resin is not injected in this manner, the possibility that a void or the like is generated and the coils 10, 20 are electrically connected to each other cannot be denied. In this respect, in a case of adopting a material having higher fluidity than that of the material such as the sealing resin for the second sealing part 50*b* as the material such as the sealing resin for the first sealing part 50*a* as in the present aspect, generation of a void described before can be prevented, and as a result, occurrence of the situation where the coils 10, 20 are electrically connected to each other can be more reliably prevented. Note that, in FIG. 24, as one example, an aspect is illustrated in which one surface and another surface of the core 500 and a part of side surfaces of the core 500 are exposed from the second sealing part 50*b*; however, the present invention is not limited to such an aspect, and for example, an aspect as illustrated in FIG. 25 to be described later can be used.

Seventh Embodiment

Next, a seventh embodiment of the present invention will be described.

Figure 25:
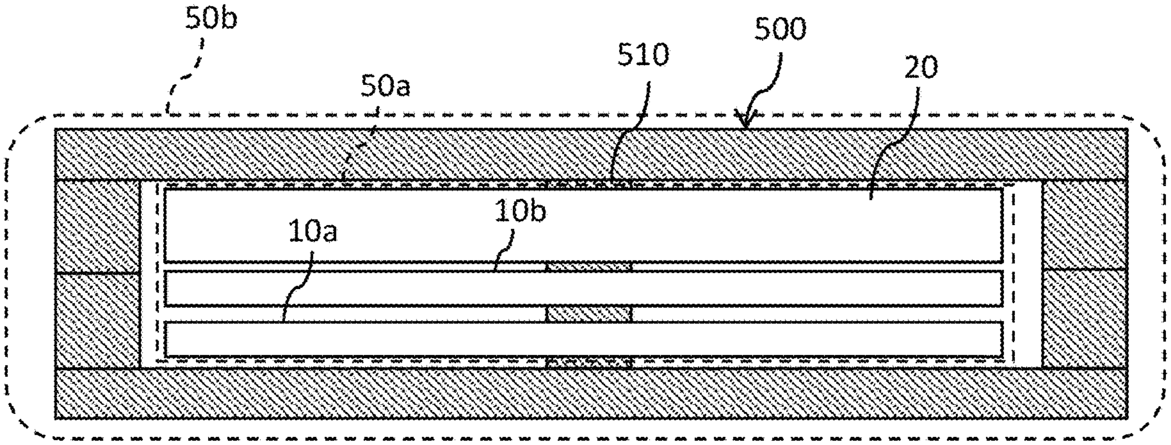
FIG. 25 is a side view of a primary coil, a secondary coil, a core, and a coil sealing part which can be used in a seventh embodiment of the present invention as viewed along the second direction.

In the present embodiment, as illustrated in FIG. 25, a coil sealing part 50 has a first sealing part 50*a* which seals a primary coil 10 and a secondary coil 20, and a second sealing part 50*b* which seals a part or the whole of the first sealing part 50*a* and at least a part of a core 500. Then, an aspect is adopted in which thermal conductivity of the second sealing part 50*b* is higher than that of the first sealing part 50*a*. Note that the second sealing part 50*b* may cover entirety of the peripheral edge of the first sealing part 50*a*, or may cover only a part of the peripheral edge of the first sealing part 50*a*. Other configurations are similar to those of the above respective embodiments, and any aspect described in the above respective embodiments can be adopted. Identical reference signs are used for the members described in the above respective embodiments.

Since the core 500 is provided on the outer peripheral sides of the primary coil 10 and the secondary coil 20, heat is finally radiated through the core 500. In this respect, by adopting an aspect in which thermal conductivity of the second sealing part 50*b* is higher than that of the first sealing part 50*a*, heat can be dissipated through the second sealing part 50*b* that seals at least a part of the core 500. Note that, in FIG. 25, as an example, an aspect is adopted in which entirety of the core 500 is sealed with the second sealing part 50*b*; however, the present invention is not limited to such an aspect, and for example, an aspect as illustrated in FIG. 24 can also be used.

As described above, in the present embodiment, any aspect described in the above respective embodiments can be adopted, and therefore, for example, the aspect described in the sixth embodiment can be adopted. In this case, for the first sealing part 50*a*, a material having relatively high fluidity and low thermal conductivity as compared with those of the second sealing part 50*b* can be used, and for the second sealing part 50*b*, a material having relatively low fluidity and high thermal conductivity as compared with those of the first sealing part 50*a* can be used. As a result, generation of a void in the first sealing part 50*a* is prevented and the situation in which the coils 10, 20 are electrically connected to each other is more reliably prevented from occurring, and a high heat dissipation effect can be achieved due to high thermal conductivity in the second sealing part 50*b*.

Eighth Embodiment

Next, an eighth embodiment of the present invention will be described.

In the present embodiment, a coil sealing part 50 has a first sealing part 50*a* which seals a primary coil 10 and a secondary coil 20, and a second sealing part 50*b* which seals at least a part of a core 500 (see FIGS. 24 and 25). Then, an aspect is adopted in which although the material of the first sealing part 50*a* and the material of the second sealing part 50*b* are different, the respective materials of the first sealing part 50*a*, the primary-side sealing part 150, and the secondary-side sealing part 250 are identical, or the respective materials of the second sealing part 50*b*, the primary-side sealing part 150, and the secondary-side sealing part 250 are identical. Other configurations are similar to those of the above first to fifth embodiments, and any aspect described in the above first to fifth embodiments can be adopted. Identical reference signs are used for the members described in the above respective embodiments.

For example, in a case where the respective materials for the second sealing part 50*b*, the primary-side sealing part 150, and the secondary-side sealing part 250 are identical and in a case where the material for the first sealing part 50*a* has higher fluidity than that of the material for the second sealing part 50*b*, while a special or expensive material having high fluidity can be used for the first sealing part 50*a*, a highly versatile and inexpensive material can be used for the second sealing part 50*b*, the primary-side sealing part 150, and the secondary-side sealing part 250 other than the first sealing part 50*a*.

For example, in a case where the respective materials for the first sealing part 50*a*, the primary-side sealing part 150, and the secondary-side sealing part 250 are identical and in a case where the material for the second sealing part 50*b* has higher thermal conductivity than that of the material for the first sealing part 50*a*, while a special or expensive material having high thermal conductivity can be used for the second sealing part 50*b*, a highly versatile and inexpensive material can be used for the first sealing part 50*a*, the primary-side sealing part 150, and the secondary-side sealing part 250 other than the first sealing part 50*a*.

Ninth Embodiment

Next, a ninth embodiment of the present invention will be described.

Figure 26:
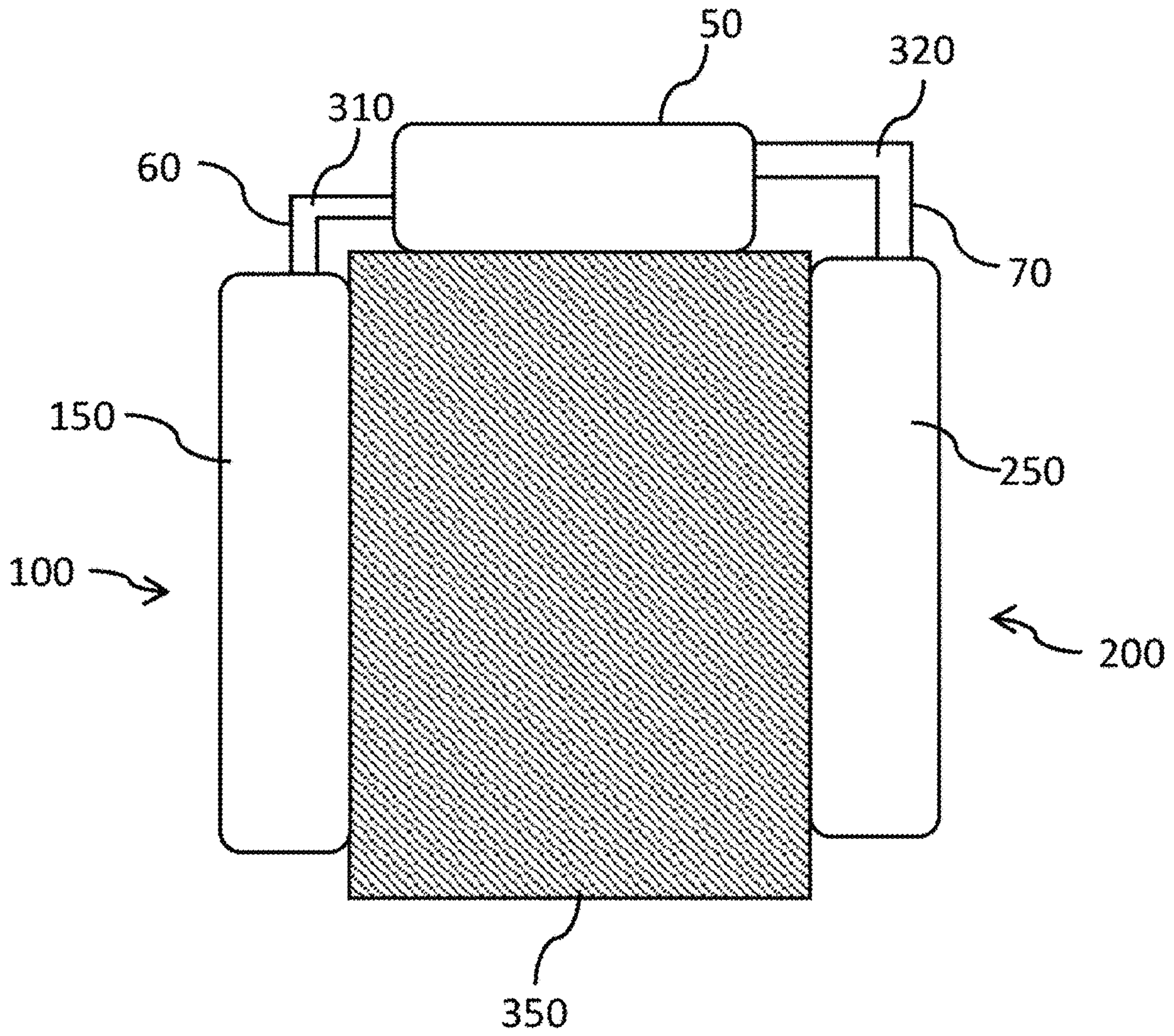
FIG. 26 is a side view illustrating the relationship among a coil sealing part, a primary-side sealing part, a secondary-side sealing part, and a cooling body which can be used in an eighth embodiment of the present invention.

In the present embodiment, an aspect is adopted in which a first bent part 310 is provided in a primary-side extended part 60 between a coil sealing part 50 and a primary-side sealing part 150, a second bent part 320 is provided in a secondary-side extended part 70 between the coil sealing part 50 and a secondary-side sealing part 250, or the first bent part 310 is provided in the primary-side extended part 60 between the coil sealing part 50 and the primary-side sealing part 150 and in addition, the second bent part 320 is provided in the secondary-side extended part 70 between the coil sealing part 50 and the secondary-side sealing part 250 (see FIG. 26). Other configurations are similar to those of the above respective embodiments, and any aspect described in the above respective embodiments can be adopted. Identical reference signs are used for the members described in the above respective embodiments.

According to the present embodiment, the coil sealing part 50, the primary-side sealing part 150, and the secondary-side sealing part 250 can be arranged along different planar directions, respectively. Furthermore, the primary-side sealing part 150 and the secondary-side sealing part 250 can also be arranged such that back surfaces thereof face each other. The coil sealing part 50 and the primary-side sealing part 150 may be arranged so as to be bent at a first angle (for example, 60 degrees, 90 degrees, 120 degrees, or the like), and the coil sealing part 50 and the secondary-side sealing part 250 may be arranged so as to be bent at a second angle (for example, 60 degrees, 90 degrees, 120 degrees, or the like).

Also in the present embodiment, a cooling body 350 such as a heat sink may be provided on a back surface of the coil sealing part 50, a back surface of the primary-side sealing part 150, and a back surface of the secondary-side sealing part 250. In the case of adopting such an aspect, it is advantageous in that the coil sealing part 50, the primary-side sealing part 150, and the secondary-side sealing part 250 can be cooled by the cooling body 350. As an example, for example, in a case where an aspect is adopted in which the coil sealing part 50 and the primary-side sealing part 150 are arranged so as to be bent at 90 degrees and the coil sealing part 50 and the secondary-side sealing part 250 are arranged so as to be bent at 90 degrees, the back surface of the coil sealing part 50, the back surface of the primary-side sealing part 150, and the back surface of the secondary-side sealing part 250 can be arranged so as to come into contact with three surfaces of the cooling body 350 including a heat sink or the like, respectively, which is advantageous in that a high cooling effect can be expected.

Figure 27:
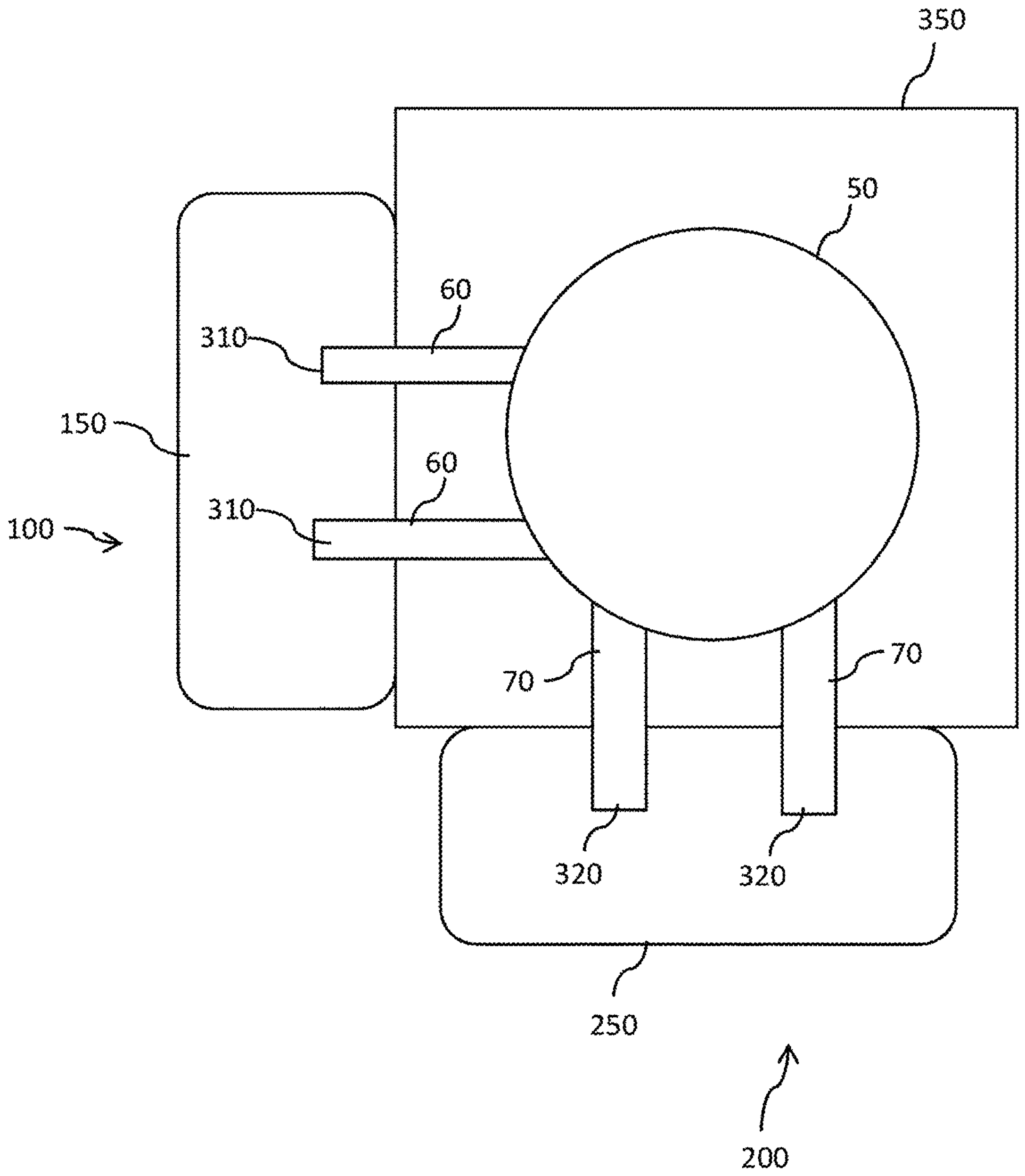
FIG. 27 is a plan view illustrating an example of an arrangement aspect of a primary-side sealing part and a secondary-side sealing part which can be used in an embodiment of the present invention.

A primary-side terminal 60 and a secondary-side terminal 70 do not need to be provided along a straight line, and may be provided, for example, orthogonal to each other in a planar direction, or may be provided so as to be crossed at an angle other than 90 degrees in a planar direction. In FIG. 27, an aspect is illustrated in which the primary-side terminal 60 and the secondary-side terminal 70 are orthogonal to each other in a planar direction. As described above, according to the present embodiment, the primary-side sealing part 150 and the secondary-side sealing part 250 can be arranged in any direction in a planar direction, and can be bent by using the first bent part 310 and the second bent part 320.

The description of the above-described respective embodiments and the disclosure of the drawings are merely examples for describing the invention described in the claims, and the invention described in the claims is not limited by the description of the above-described embodiments or the disclosure of the drawings.

Furthermore, the description of the claims at the beginning of the application is merely an example, and the description of the claims can be appropriately changed on the basis of the description of Description, the drawings, or the like.

REFERENCE SIGNS LIST

10 primary coil
20 secondary coil
50 coil sealing part
50*a* first sealing part
50*b* second sealing part
110 primary-side electronic element
150 primary-side sealing part
210 secondary-side electronic element
250 secondary-side sealing part
500 core
600 insulating sheet

The invention claimed is:

1. A magnetic component comprising:

a primary coil having a first coil and a second coil connected to the first coil;

a secondary coil disposed to face the primary coil;

a core comprising a middle leg and a pair of outer legs, wherein the middle leg is configured to pass through the primary coil and the secondary coil; and a coil sealing part which seals at least the primary coil and the secondary coil, and a part or whole of region between the primary coil and the secondary coil and the core, wherein an insulating sheet is provided between outer lateral side surfaces of the primary coil and the secondary coil, and an inner surface of outer leg of the core, the insulating sheet being in contact with the outer lateral side surfaces of the primary coil and the secondary coil, and the inner surface of outer leg of the core;

wherein upper surface of the core is covered by the coil sealing part and lower surface of the core is exposed from the coil sealing part, and wherein the primary coil including the first coil and the second coil is provided entirely on lower side of the secondary coil.

2. The magnetic component according to claim 1 wherein an insulating sheet is provided between upper surface side of the primary coil or the secondary coil and the core, or between lower surface side of the primary coil or the secondary coil and the core.

3. The magnetic component according to claim 1 further comprising:

a primary-side electronic element connected to the primary coil;

a primary-side sealing part sealing the primary-side electronic element;

a secondary-side electronic element connected to the secondary coil; and a secondary-side sealing part sealing the secondary-side electronic element, wherein materials of the coil sealing part, the primary-side sealing part, and the secondary-side sealing part are identical.

4. The magnetic component according to claim 1 wherein the coil sealing part has a first sealing part which seals the primary coil and the secondary coil, and a second sealing part which seals at least a part of the core, and a material for the first sealing part has a higher fluidity than a material for the second sealing part.

5. The magnetic component according to claim 1 wherein the coil sealing part has a first sealing part which seals the primary coil and the secondary coil, and a second sealing part which seals at least a part of the core, and thermal conductivity of the second sealing part is higher than thermal conductivity of the first sealing part.

6. The magnetic component according to claim 1 further comprising:

a primary-side electronic element connected to the primary coil;

a primary-side sealing part sealing the primary-side electronic element;

a secondary-side electronic element connected to the secondary coil; and a secondary-side sealing part sealing the secondary-side electronic element, wherein the coil sealing part has a first sealing part which seals the primary coil and the secondary coil, and a second sealing part which seals at least a part of the core, a material of the first sealing part and a material of the second sealing part are different, and materials of the first sealing part, the primary-side sealing part and the secondary-side sealing part are identical, or materials of the second sealing part, the primary-side sealing part and the secondary-side sealing part are identical.

* * * * *